United States Patent

Spauschus et al.

[15] 3,687,511
[45] Aug. 29, 1972

[54] DEVICE FOR INFINITELY VARIABLE ADJUSTMENT OF THE PLAY OF AN ANTIFRICTION BEARING FOR A SPINDLE OR THE LIKE

[72] Inventors: Karl Spauschus, Weitramsdorf; Brotoharsojo Darmawan, Coburg, both of Germany

[73] Assignee: Werkzeugmaschinenfabrik Adolf Waldrich Coburg, Coburg, Germany

[22] Filed: Jan. 20, 1971

[21] Appl. No.: 107,945

[30] Foreign Application Priority Data

Jan. 23, 1970 Germany..........P 20 02 899.3

[52] U.S. Cl..............................................308/207
[51] Int. Cl..............................................F16c 19/14
[58] Field of Search...........................308/207, 189

[56] References Cited

UNITED STATES PATENTS 306,510 10/1884 Murray......................308/189
1,742,512 1/1930 Leonard..................308/207 A Primary Examiner—Martin P. Schwadron
Assistant Examiner—Frank Susko
Attorney—Woodhams, Blanchard and Flynn

[57] ABSTRACT

A device for varying the adjustment of the clearance or play in an antifriction bearing for a machine tool spindle. A sleeve is mounted for both a rotatable and axial movement in a spindle housing. The inner surface of the sleeve has an outer race for a plurality of first rolling bodies. The outer surface of the sleeve adjacent the outer race has a conical shape. A plurality of second rolling bodies are guided obliquely on the conical outer surface at an angle to the axis of rotation of the sleeve. A member having an inner conical surface thereon is secured to the spindle housing and defines the outer race for the second rolling bodies. A rotation of the sleeve will effect an axial movement thereof to change the spacing between the inner and outer conical surfaces.

12 Claims, 6 Drawing Figures

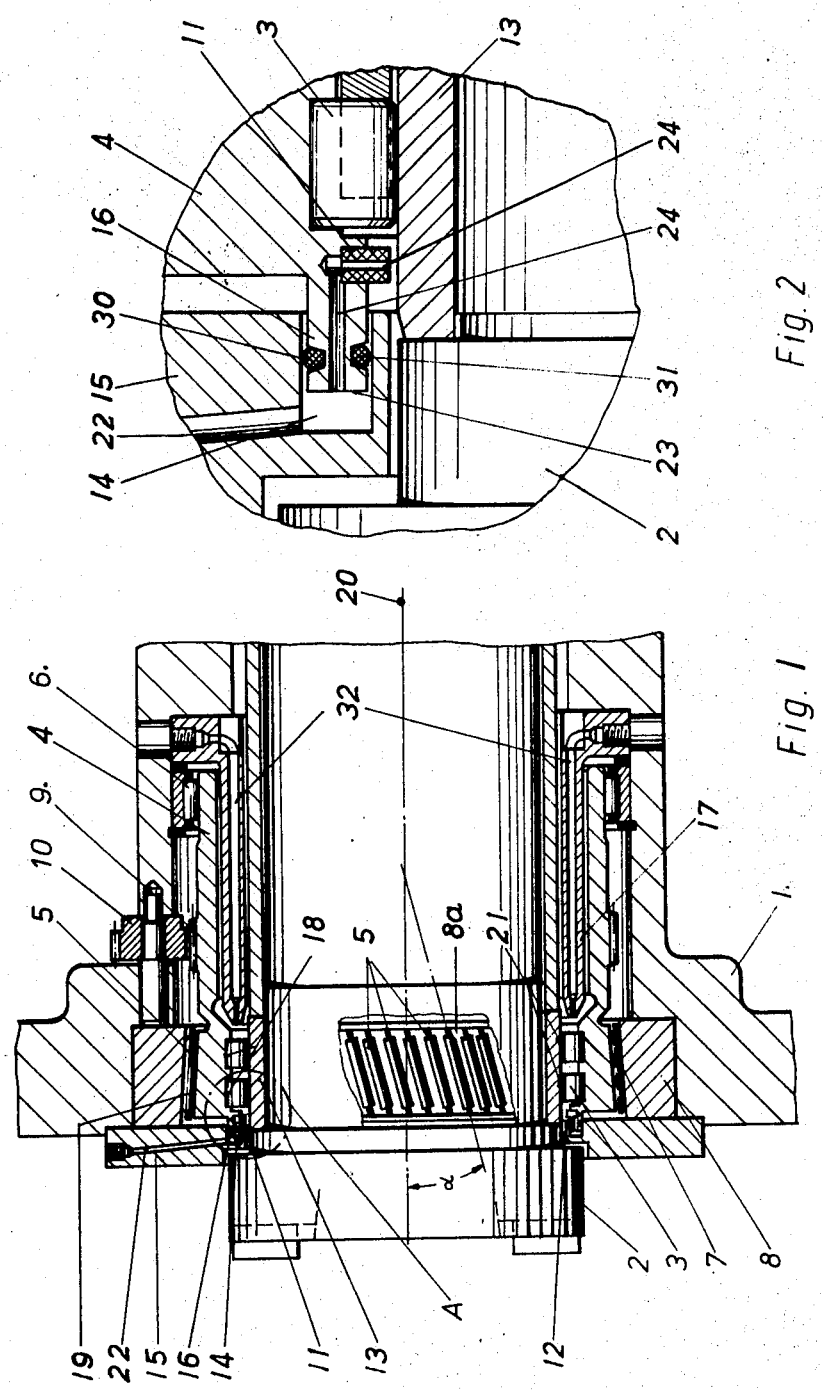

DEVICE FOR INFINITELY VARIABLE ADJUSTMENT OF THE PLAY OF AN ANTIFRICTION BEARING FOR A SPINDLE OR THE LIKE

This invention relates to a device for infinitely variable adjustment of the play of an antifriction bearing for a spindle or the like.

In the antifriction mounting of spindles, shafts or the like which operate in a large range of speeds and loads, varying thermal expansion values occur at the inner and outer races of the antifriction bearing in consequence of the varying temperature behavior of the surrounding parts, these varying thermal expansion values resulting in variable diameter measurements for the inner and outer raceways. The play of the bearing is therefore subject to variations, which are unfavorable for the running behavior of the spindle or shaft. The variations in the bearing play are also particularly detrimental insofar as the evolution of heat in the antifriction bearing depends on the other hand very greatly on the bearing play itself, so that the bearing may fail prematurely, i.e., may be very short-lived, as a result of a so-called reactive effect. So much play has therefore been provided heretofore in the bearing that the reactive effect has been reliably avoided in the most unfavorable case of operation thermally. This comparatively large play, however, has an unfavorable effect on the running behavior as long as it is not compensated by said thermal expansions.

In the case of antifriction bearings with a large range of speeds and loads, with high demands at the same time on accuracy of guiding and on rigidity at every working point, for example as in main spindle bearings of machine tools, it is endeavored to keep the bearing play constant or almost constant. By bearing play there is also to be understood in the widest sense a biasing as so-called negative play. This has not yet been possible heretofore, however.

A device for adjusting the bearing play at the main spindle of a machine tool is know which uses the method customary in antifriction bearings with pressure angles not equal to zero, of adjusting the radial play by axial displacement of the inner and/or outer race of the antifriction bearing with respect to one another. The spindle is mounted in two tapered-roller bearings, an outer race of which is accommodated in an axially movable sleeve which is hydraulically shifted selectively against two fixed stops. Thus, only two adjustments of the bearing play are possible, these being selectable according to the switched-on speed of the main spindle. Infinitely variable adjustment is not possible, nor is the bearing play constant at every working point.

It is moreover known to adjust the bearing play in a grinding spindle bearing in which the outer race of the antifriction bearing is sealed off at the outer surface from the bore in the housing and oil is forced at high pressure into the gap between the outer race and the bore. In this process the outer race is compressed concentrically, the bearing play being reduced. As only a single oil chamber is used in this known device, the outer race floats within the gap, a directional effect not being attainable. Only a damping action is obtained, which contributes towards the preservation of a high surface quality. It is true that if it were desired to divide the gap or the chamber between the outer race of the antifriction bearing and the bore in the housing into a plurality of chambers, similarly to what is done in the case of hydrostatic bearings, a directional effect would be obtained, but because of the necessary webs there would be an inadmissible distortion of the circular shape of the outer race of the antifriction bearing.

Finally, it has also been proposed to choose the distance between two antifriction bearings in accordance with the pressure angle of the bearings in such manner that the reduction in play occurring as a result of the radial thermal expansion is compensated by the axial thermal expansion. This, however, presupposes a certain, constantly recurring distribution of heat in the shaft and the housing. A recurring distribution of heat of this kind cannot, however, be obtained in practice; on the contrary, the generally different coefficients of thermal expansion of the shaft and housing materials, the heat conductivity behavior and the temperature field developing as a result in a varying manner in the shaft and housing interfere with the ideal thermal expansion behavior in consequence of a heat output which varies with time. The change in play can certainly be reduced in this way, but not prevented. Moreover, the use of this method and also the method of the shifting of the outer and inner races with respect to one another is restricted to antifriction bearings of certain structural forms. Cylindrical roller bearings, which are preferred in particular in the mounting of machine tool spindles and in general for high loads, are not suitable therefore.

The problem underlying the invention consists in providing a device which renders possible infinitely variable adjustment of the play of an antifriction bearing for a spindle or the like during operation, i.e., during the rotation of the spindle or the like, in such manner that, for example, on restriction or reduction of the bearing play in consequence of thermal expansion, an increase in the bearing play can be effected.

According to the invention, this problem is solved by means of a. a sleeve mounted rotatably and for axial displacement in a housing for the spindle, or the like, the inner surface of said sleeve carrying the outer raceway for first rolling bodies of the antifriction bearing and the outer surface thereof being of slightly conical form in the region of the antifriction bearing, b. a plurality of second rolling bodies guided obliquely on this conical outer surface at an angle to the axis of rotation of the sleeve, c. an inner cone arranged in the housing parallel to the conical outer surface of the sleeve as the outer raceway for the second rolling bodies, and d. a rotary drive for the sleeve.

On turning of the sleeve, it is moved into or out of the inner cone like a screw in consequence of the oblique guiding of the second rolling bodies, the inside width of the sleeve changing through elastic deformation and a change in the bearing play being accordingly obtained in consequence of a narrowing of the outer raceway of the rolling bodies. The device according to the invention can be employed for all constructional forms of antifriction bearings and permits infinitely variable adjustment of the play of an antifriction bearing even during operation, i.e., rotation, of the spindle or the like.

According to a first embodiment of the invention, the oblique guiding of the rolling bodies can be obtained in that the second rolling bodies are bearing needles the pivots of which are guided so that they are crossed with respect to the axis of rotation of the sleeve by being mounted off-set in a cage at an angle.

Another constructional form is characterized in that helically extending bearing grooves are provided in the outer surface of the sleeve and/or the inner cone and the second rolling bodies are in the form of bearing balls and are guided in these bearing grooves.

In order to detect a change in the bearing play during operation, two sensing elements arranged opposite one another in the sleeve immediately adjacent the inner surface thereof, or rather the outer raceway of the rolling bodies, are advantageously provided, said sensing elements measuring any change in the distance of the sleeve from the inner raceway of the rolling bodies on an inner race of the antifriction bearing. Various physical principles which ensure contactless measurement may be employed for the sensing elements.

Advantageously, however, the sensing elements are measuring nozzles fed with compressed air, the orifices of which are directed at the inner raceway for the rolling bodies and which measure the change in distance by means of the dynamic pressure. These measuring nozzles are advantageously part of an arrangement for automatically keeping the play of the antifriction bearing constant and which has a comparator to which the actual value of the bearing play determined by the measuring sensing elements or nozzles, which is proportional to the distance between the measuring nozzles and the inner raceway for the rolling bodies, is supplied for the purpose of comparison with a predetermined desired value. The actual value corresponds to the measured dynamic pressure which is obtained when the air flowing out of the measuring nozzles flows against the inner raceway for the rolling bodies and which changes with a change in the distance of the measuring nozzles from this inner raceway. In the comparator there is produced as a result of the comparison between the actual value and the desired value a control signal corresponding to the difference between these values, which control signal is amplified by an amplifier connected at the output side and supplied to a servo motor with a drive pinion. This drive pinion meshes with a ring gear arranged on the sleeve and turns the sleeve until the difference between the actual value and the desired value disappears.

The invention and its advantageous developments are described in detail hereinafter with reference to embodiments illustrated in the drawings.

In the drawings:

FIG. 1 is a longitudinal section through a first embodiment of a device according to the invention;

FIG. 2 shows on a larger scale the details contained in the chain-dotted circle A in FIG. 1;

Figure 3:
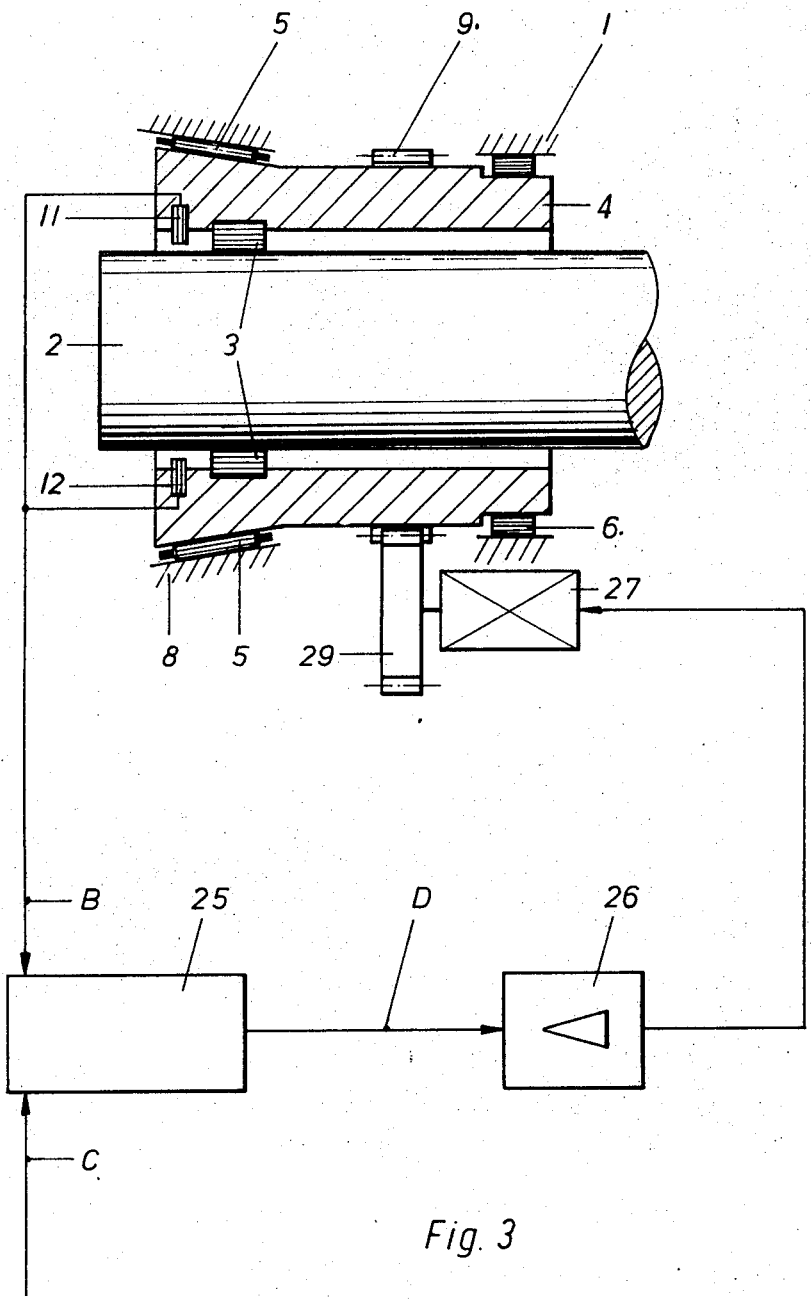
FIG. 3 is a block circuit diagram of the arrangement for automatically keeping the play of the antifriction bearing constant.

In the embodiment shown in FIGS. 1 to 3, in a housing 1 a machine tool spindle 2 is guided at its front end in a two-row antifriction bearing with first rolling bodies 3. In the embodiment shown, this antifriction bearing is a cylindrical roller bearing. In the housing 1 there is provided a sleeve 4 which is mounted rotatably and for axial displacement and the inner surface 18 of which is formed as the outer raceway or outer race for the rolling bodies 3 of the antifriction bearing. The outer surface 19 of the sleeve 4 is of slightly conical form in the region of the antifriction bearing and serves as a raceway for a ring of bearing needles 5 guided on this conical outer surface so that they are crossed at an angle $\alpha$ with respect to the axis of rotation 20 of the sleeve 4. The bearing needles 5 may be arranged in a cage 8a. The rear end of the sleeve 4 is supported in the housing 1 through another roller bearing 6. Moreover, an inner cone 7 parallel to the conical outer surface of the sleeve 4 is provided in the housing 1 as an outer raceway for the bearing needles 5. This inner cone 7, however, is arranged with advantage on an outer race or ring 8 forced tightly into the housing 1. The cone angle of the outer surface 19 of the sleeve 4 and the crossing angle $\alpha$ of the bearing needles are chosen smaller than the angle of friction, so that on rotation in the inner cone 7 the sleeve 4 rotates in or out according to the direction of rotation and thereby necessarily changes its diameter in this zone. An angle of about 1° has been found to be satisfactory as the crossing angle $\alpha$ for the bearing needles 5. The slightly conical outer surface 19 of the sleeve 4 advantageously corresponds in pitch to the surface of a 1 : 30 cone. As a result of the chosen angles of such small size, favorable force and travel ratios are moreover obtained, so that only small forces have to be applied for turning the sleeve 4 and, furthermore, the turning of the sleeve 4 does not have to be carried out in a particularly sensitive manner.

An arrangement for measuring a change in the play of the antifriction bearing advantageously consists of two sensing elements arranged opposite one another in the sleeve 4 immediately adjacent the inner surface 18 thereof, or rather the outer raceway for the rolling bodies 3, these sensing elements measuring any change in the distance of the sleeve 4 from the inner raceway 21 for the rolling bodies 3 on an inner race 13 of the antifriction bearing. These sensing elements are advantageously measuring nozzles 11 and 12 fed with compressed air and connected in parallel with one another, the orifices 28 of which are directed at the inner raceway 21 for the rolling bodies 3 and which measure the change in distance by means of the change in the dynamic pressure. The parallel connection of two nozzles located opposite one another eliminates measuring errors which may possibly occur in consequence of deflection of the spindle under load; moreover, the sensitivity is thereby doubled.

In the preferred embodiment illustrated, the sleeve 4 has at its end face in the region of the measuring nozzles 11, 12 a coaxial extension in the form of an annular piston 16 which is slidable in sealing relationship in an annular chamber 14 in the housing 1 in communication with a feed duct 22 for the compressed air and has inlets 24 opening at its end face 23 and leading to the measuring nozzles 11, 12 (FIG. 2). The sealing is effected by means of an outer and an inner annular packing 30 and 31, respectively. In this way the rotary and axial movement of the sleeve 4 does not impede the supply of compressed air. At the same time, the sleeve 4 is pressed into the inner cone 7 with a force corresponding to the dynamic pressure, as a result of which the bearing action of the bearing needles 5 on the inner cone 7 is maintained even on relief of the sleeve 4. In the embodiment shown, the annular chamber 14 and the feed duct 22 are arranged in an end cover plate 15 of the housing 1.

Finally, in the embodiment shown there is also an arrangement for automatically keeping the play of the antifriction bearing constant. As can be gathered from FIG. 3, in this arrangement the actual value (arrow B) of the bearing play determined by the measuring sensing elements or nozzles 11, 12 is supplied to a comparator 25 for the purpose of comparison with a predetermined desired value, which is represented by the arrow C. This comparator 25 forms from the actual value and the desired value a control signal (arrow D) corresponding to the difference between these values, this control signal being amplified in an amplifier 26 connected at the output side of the comparator and then supplied to a servo motor 27, which has a drive pinion 29. This drive pinion 29 is in mesh with a ring gear 9 arranged on the sleeve 4, if necessary with the interposition of an intermediate gear 10 (FIG. 1). In accordance with the control signal made available by the comparator 25, the servo motor 27 rotates the sleeve 4 into or out of the outer race 8 and in this way makes possible a reduction or increase in the play of the antifriction bearing comprising the rolling bodies 3 for the purpose of compensating the deviations from the desired value of the bearing play occurring through thermal expansion.

The second sleeve 17 visible in FIG. 1, which is arranged between the sleeve 4 and the spindle 2, extends substantially parallel to the longitudinal axis 20 and has bores provided in off-set arrangement at its periphery, serves to supply lubricant to the rolling bodies 3.

Figure 4:
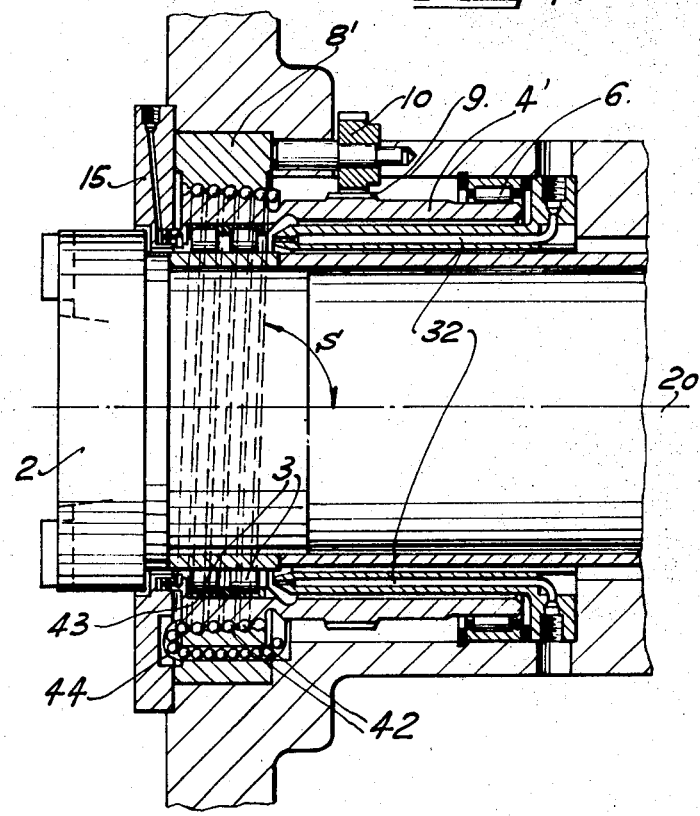
FIG. 4 is a longitudinal section through a second embodiment.
Figure 5:
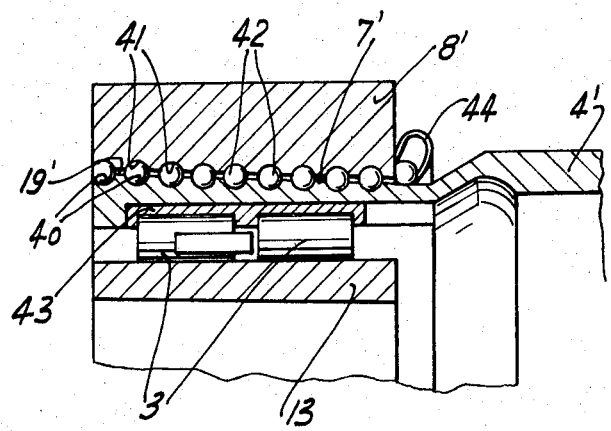
FIG. 5 is a partial longitudinal section through this embodiment.

In the embodiment shown in FIGS. 4 and 5, those parts which correspond to those in the first embodiment are designated by the same reference numerals. Parts with the same function, but of different constructional form, are each furnished with an index mark. In the embodiment shown in FIGS. 4 and 5, the sleeve 4' is likewise mounted so that it is rotatable and axially displaceable. In the region of the first rolling bodies 3 it has an outer surface 19' which is likewise of slightly conical form. A helical bearing groove 40 is worked into this outer surface 19'. The outer race 8' has an inner cone 7' into which a helical bearing groove 41 is likewise worked, the pitch of this groove coinciding with that of the bearing groove 40. The bearing balls 42 are arranged in the two bearing grooves 40, 41, which have a substantially semi-circular cross-section. The outer race for the rolling bodies 3 is formed in this case by a separate bearing ring 43 which is inserted into the inner face 18' of the sleeve 4'.

When the sleeve 4' is rotated by the pinion 10, it screws itself into or out of the outer race 8'. Due to the conical outer surface 19' and the inner cone 7', the sleeve is thereby compressed or expands owing to its elasticity. In this way, adjustment of the bearing play can be effected as in the case of the embodiment first described.

If the sleeve 4' must be rotated by a rather large amount in order to eliminate a rather large bearing play, it is expedient, as shown in FIG. 4, to provide a return tube 44 for the bearing balls 42. If, for example, on rotation of the sleeve 4', the bearing balls emerge on the left side of the bearing grooves 40, 41, they are introduced into the bearing grooves 40, 41 again on the right side by means of the return tube 44. The return tube 44 is completely filled with balls at any given time. The embodiment shown in FIGS. 4 and 5 is distinguished by particularly small hysteresis and great rigidity. It is therefore particularly suitable for control of adjustment.

Figure 6:
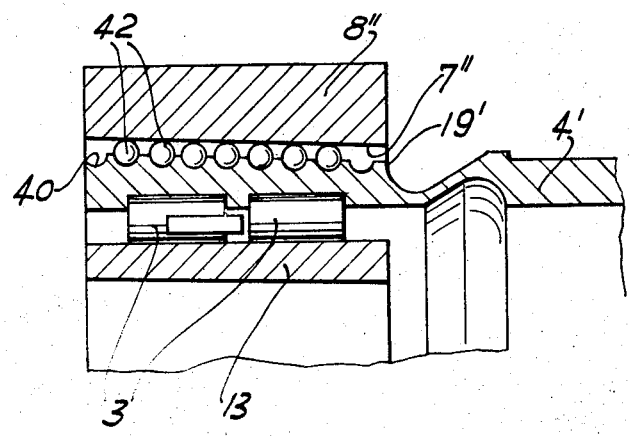
FIG. 6 is a modified form of this embodiment.

In the embodiment shown in FIG. 6, the inner cone 7'' of the outer race 8'' is of plain form. On rotation of the sleeve 4', axial displacement thereof is also effected in this case by the bearing balls 42 guided in the helical bearing groove 40.

We claim:

1. Device for infinitely variable adjustment of the play of an antifriction bearing for a spindle or the like, characterized by
   a. a sleeve mounted rotatably and for axial displacement in a housing for a spindle or the like, the inner surface of said sleeve carrying the outer raceway for first rolling bodies of the antifriction bearing and the outer surface thereof being of slightly conical form in the region of the antifriction bearing,
   b. a plurality of second rolling bodies guided obliquely on this conical outer surface at an angle to the axis of rotation of the sleeve,
   c. an inner cone arranged in the housing parallel to the conical outer surface of the sleeve as the outer raceway for the second rolling bodies, and
   d. a rotary drive for the sleeve.

2. Device according to claim 1, characterized in that the second rolling bodies are bearing needles the pivots of which are guided so that they are crossed with respect to the axis of rotation of the sleeve by being mounted off-set in a cage at an angle.

3. Device according to claim 1, characterized in that the crossing angle of the bearing needles is about 1°.

4. Device according to claim 1, characterized in that helically extending bearing grooves are provided in the outer surface of the sleeve and/or the inner cone and the second rolling bodies are in the form of bearing balls and are guided in these bearing grooves.

5. Device according to claim 4, characterized in that for returning the bearing balls which emerge at one end of the bearing grooves a return tube leading to the other end of the bearing grooves (40, 41) is provided.

6. Device according to claim 1, characterized in that the slightly conical outer surface of the sleeve corresponds to the surface of a 1 : 30 cone.

7. Device according to claim 1, characterized in that the inner cone is arranged on an outer race forced tightly into the housing.

8. Device according to claim 1 with an arrangement for measuring the change in the play of the antifriction bearing, characterized in that this arrangement has two sensing elements arranged opposite one another in the sleeve immediately adjacent the inner surface thereof, or rather the outer raceway of the rolling bodies, said sensing elements measuring any change in the distance of the sleeve from the inner raceway of the rolling bodies on an inner race of the antifriction bearing.

9. Device according to claim 8, characterized in that the sensing elements are measuring nozzles fed with compressed air and connected in parallel with one another, the orifices of which are directed at the inner raceway for the rolling bodies and which measure the change in the distance by means of the change in the dynamic pressure.

10. Device according to claim 9, characterized in that the sleeve has at its end face in the region of the measuring nozzles a coaxial extension in the form of an annular piston which is slidable in sealing relationship in an annular chamber in the housing in communication with a feed duct for the compressed air and has inlets opening at its end face and leading to the measuring nozzles.

11. Device according to claim 10, characterized in that the annular chamber and the feed duct are arranged in an end cover plate of the housing.

12. Device according to claim 8 with an arrangement for automatically keeping the play of the antifriction bearing constant, characterized by a comparator to which the actual value of the bearing play determined by the measuring sensing elements or nozzles is supplied for the purpose of comparison with a predetermined desired value and which forms a control signal therefrom, an amplifier for this control signal connected at the output side of the comparator, and a servo motor having a drive pinion which is in mesh with a ring gear arranged on the sleeve.

* * * * *